United States Patent [19]

Markus

[11] 3,893,428

[45] July 8, 1975

[54] THERMODYNAMIC CYCLE FOR ROTARY ENGINES

[76] Inventor: Isidoro N. Markus, 65-36 99th St., Rego Park, N.Y. 11374

[22] Filed: July 27, 1973

[21] Appl. No.: 383,067

[52] U.S. Cl. ............. 123/8.11; 123/8.45; 123/8.13; 123/122 E; 123/8.49
[51] Int. Cl. .............................. F02b 53/04
[58] Field of Search ........... 123/32 AH, 32 J, 34 A, 123/122 E, 122 C, 8.11, 8.01, 8.49, 8.13

[56] References Cited
UNITED STATES PATENTS

| | | | |
|---|---|---|---|
| 2,881,828 | 4/1959 | McGinnis | 123/122 E |
| 3,358,439 | 12/1967 | Castelet | 123/8.11 X |
| 3,508,530 | 4/1970 | Clawson | 123/8.13 UX |
| 3,630,184 | 12/1971 | Wolf | 123/32 AH |
| 3,648,669 | 3/1972 | Rank | 123/32 AH |
| 3,650,261 | 3/1972 | Hutsell | 123/32 J |
| 3,765,382 | 10/1973 | Vandenberg | 123/34 A |

FOREIGN PATENTS OR APPLICATIONS

| | | | |
|---|---|---|---|
| 886,888 | 11/1971 | Canada | 123/34 A |
| 874,428 | 8/1961 | United Kingdom | 123/34 A |

*Primary Examiner*—Clarence R. Gordon
*Attorney, Agent, or Firm*—Bauer and Amer

[57] ABSTRACT

This invention refers to the operation of a rotary internal combustion engine, having an injected fuel combustion process, whereby fuel is ignited and burned in an excess of air compressed to a temperature below said fuel ignition temperature, and whereby the fuel is injected at a temperature above said fuel ignition temperature.

3 Claims, 3 Drawing Figures

THERMODYNAMIC CYCLE FOR ROTARY ENGINES

BACKGROUND OF THE INVENTION

One of the limitations of large Diesel engines is the sheer volume, weight, complexity and cost when they approach the 20,000 HP range. In the 20,000 plus horsepower range, that this patent is concerned with, some of the big Diesel engine applications have been replaced by turbo-steam or turbo-gas powerplants. The buying cost of a turbo engine unit is not much lower than the equivalent Diesel engine; the Diesel engine fuel economy is superior, its maintenance is lower, and the choice of suppliers is wider. But under certain circumstances the turbo engine has a decisive advantage in size and weight, and after 50,000 HP, today's limit in Diesel engines, the only available power plant is the turbo-steam engine with all its boilers, condensers, pumps, turbine(s) and gear reduction(s).

Lately some turbo-gas engines have appeared in the market, since they are cheaper and simpler that any known engine. A drawback is their unacceptable high fuel consumption.

Basically the only way of increasing the output power in any reciprocal internal combustion engine is increasing its cylinders displacement. Engines are already working at maximum combustion temperatures, thermodynamic efficiencies are good, rotating speeds are set by generators or propellers, and brake mean pressures are already related to engine life expectancy. So, if we want more horsepower we must get more displacement, and increase almost linearly weight, volume and cost.

In the other hand, if we where resolved to use a rotary type engine, —namely the Wankel— we could get the same displacement as a reciprocal piston type engine but with half its volume, a third of its weight, and probably a third of its cost.

The successful story of the Wankel engine working in the Otto cycle is too well known to be told here; but expectancy of a similar success as a compression ignition engine failed to materialize because of:

1. the difficulty of obtaining a high enough compression ratio
2. a shallow and elongated combustion chamber
3. a high surface to volume ratio at top dead center (t.d.c.)
4. poor gas sealing at the low speeds needed for a Diesel cycle
5. unstable geometry of the rotor housing due to high pressure and temperatures.

In the gasoline Wankel engines a compression ratio of 9:1 is common; if we want to increase this ratio we must raise the ratio between the generating radius and the eccentricity of the trochoid housing (R/e ratio). But this would result in a bigger engine with an even larger surface/volume ratio at t.d.c. for a given displacement. The space at t.d.c. would become more elongated and shallow, and the problem of achieving an even distribution for the injected fuel would be made worse. Reducing the depression in the rotor flank is impractical because an adequate depression in the rotor must be provided to allow the gas in the trailing pocket to be transferred to the leading pocket.

The only compression ignition engine working in a Wankel configuration is the Rolls-Royce R-6 engine. This engine, still experimental, consist in one Wankel unit working as a low pressure air compressor feeding another regular Wankel engine where a compression ratio of 18:1 is then achieved.

Using a Wankel compressor, a Roots blower, a turbocharger, or any other type of a compressor, the actual state of the art for achieving a Wankel compression ignition engine is to supercharge it.

SUMMARY OF THE INVENTION

The present invention is directed to any type of an ignition compression engine wherein it is impossible, or impractical, to reach a compression ratio high enough to assure the ignition of the injected fuel. It will be demostrated that, in any engine where the temperature of the compressed air is below the ignition temperature of the injected fuel, ignition may be attained if the injected fuel is heated to a temperature above said fuel ignition temperature. A primary object of the invention, therefore, is to operate an internal combustion engine of the compression ignition type with a modified combustion process whereby, heavy fuel is burned efficiently, in an excess of air, and where the fuel is injected at a temperature well above its ignition temperature, into a combustion chamber whereby the compressed air has a temperature well below said fuel ignition temperature.

A further advantage of the invention is the ability of reducing the amount of air being compressed, since the fuel is not ignited by the compressed air high temperature. This is an ideal solution for a powerful engine running at idle speed and/or light load factor, where most of the produced energy is spent in friction and air pumping loses.

Another object of the invention is to tune the fuel injection system of an engine in such a manner that total combustion occurs in as short a period as will produce optimum engine performance without objectionable smoke and noise.

Still another object of the invention is to heat the fuel, in the most efficient and quickest way, by pumping it through heat insulated hydraulic restrictors.

A still further object of the invention is to provide cleaner exhaust fumes, free of $NO_x$ (oxides of nitrogen) by running a cooler thermodynamic cycle; and free of unburned hydrocarbons and carbon monoxide, because the slow running cycle allows enough time to completely burn the injected fuel.

BRIEF DESCRIPTION OF THE DRAWINGS

Additional objects and advantages of the invention will become apparent by reference to the following description taken with the accompanying drawings, wherein.

DESCRIPTION OF THE PREFERRED EMBODIMENT

Figure 1:
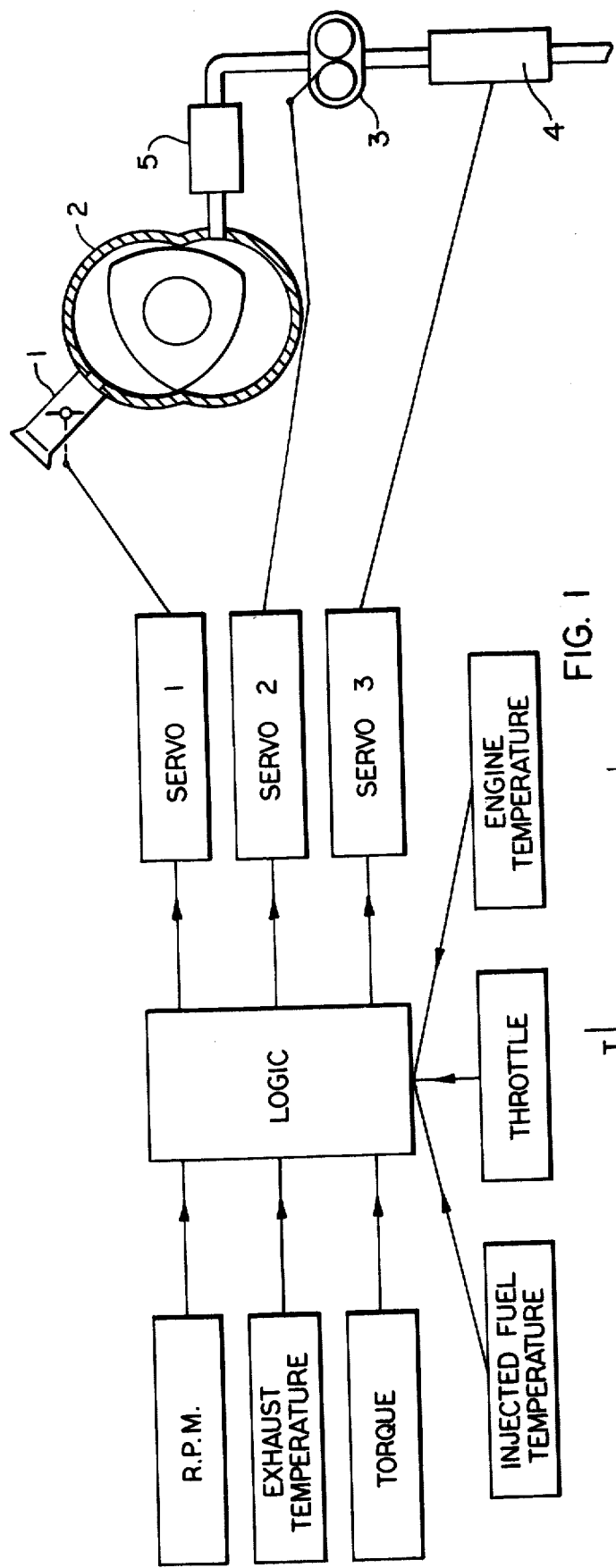
FIG. 1 is a schematic presentation of a control circuit showing the input of information by means of sensors to a logic arrangement, and how the logic output, by means of servomechanisms, actuates over sensible engine controls.

As it was stated before it is impractical to get, in a Wankel engine, a geometrical compression ratio of say 18:1 needed to assure the ignition of the injected fuel. The invention idea of getting around said obstacle, by injecting heated fuel into the low compressed air, and letting the heated fuel be the "prime mover" in starting the combustion process, has a lot of merits. Compressing air until it is hot enough to ignite the injected fuel is simplicity itself, but the thermic efficiency of heating the cold injected fuel with hot air, until the air-fuel mixture ignite, is poor.

The air compressing cycle is adiabatic in theory, but it is polytropic in reality, and compressing air to the formula $pv^n$ with a polytropic exponent of $n=1.3$ means that we need much more than double the energy necessary to compress air to an 18:1 ratio than we need to compress it to a 9:1 ratio; and in practice it is not true that the energy available in the compressed air is equal to the energy spent in compressing it, since both: compression and expansion, are polytropic cycles. Besides, higher pressures and temperatures dictates heavier motor components, greater maintenance costs, and lower engine reliability.

Furthermore, while a compression ignition engine the mass of the air and the mass of the fuel must be heated up, in this invention we only need to heat the full mass of the fuel, and to a certain degree the mass of the air, since the compression is lower. In a big engine this means a lot of saved energy, because the air mass outweights the fuel mass over 20 times.

It is evident that an engine working by this principle will operate with an unthinkable low compression of 4:1 and an air compression temperature of 100°C (212°F), since the fuel ignition does not depend on the air temperature. Of course, the amount of heat available in the fuel should be sufficient to heat up the inmediate air surrounding the fuel injected droplets in order to start the combustion process; and when lower the air temperature the longer will be the ignition delay, since heat from the droplet volume must pass through the droplet surface to heat the surrounding air to a reaction inducing level, before combustion can start.

The temperature of the injected droplet is related to the compressed air temperature and to the engine r.p.m.

When the compressed air temperature is high the transfer of heat from the fuel droplet to the surrounding air is low, then, the droplet temperature could just be above fuel ignition temperature since the air surrounding this droplet will be thermally ready to support combustion, and in not need to be heated.

The difference of temperatures between the injected droplet and the compressed air, for a given engine performance, will then establish a certain ignition delay.

If the engine r.p.m. increases, the ignition delay must be shortened by raising the fuel droplet temperature and/or the air temperature; and viceversa, for lower r.p.m. the droplet temperature and/or the air temperature could be lower. But the fuel temperature could never be below its ignition temperature while this engine works under this new cycle. Of course the engine may be designed to work (also) as a regular Diesel, in which case there is no need of heating up the injected fuel. But means should be provided that if the compressed air temperature becomes lower than the fuel ignition temperature (and no longer a Diesel), the injected fuel is heated up to assure its ignition. A regular internal combustion engine of the volumetric type would then start, and run, at low load factor under the new cycle, and as a Diesel at service load.

For a rotary type engine it may be more desirable to work under the new cycle at all regimens, though a Diesel capability may be built-in.

The compressed air temperature could be changed by restricting (throttling) the air intake. The maximum temperature that the air could reach will be established by the engine compression ratio and the manifold pressure, if any.

It should be noted that the ignition temperature of any fuel drops with increased air pressure, thus by throttling the air, the injected droplet temperature must increase, not only because of lower compressed air temperature, but also because of lower air pressure.

The size of the fuel droplets is related to the injection pressure and to the injector nozzle geometry, and since the only variable is the injection pressure we could decrease the size of the droplets by increasing the injection pressure, and viceversa.

Since the size of the droplets results from the shearing action of the fuel spray on the surrounding air, another way of regulating the droplet size is by throttling the intake air, as a result, the pressure (the density) of the compressed air will change. Less compressed air will mean less molecules of air bumping therewithin the droplet ways, therefore less chances of "atomizing" the droplet. In other words, the size of the droplet increases when the intake air is restricted. This is important for an internal combustion engine working under this new cycle since it will facilitate the starting of a very cold engine by throttling the intake air, therefore reducing the starter energy requirements since there is less air to compress, and enabling to "over-flow" the engine with hot fuel since there is less air to heat up.

In starting a cold engine the size of the droplet should be big, that is, a favorable relation between volume and surface should be attained to avoid the "freezing" of the droplet and starting engine failure. Besides, the droplet should have the maximum temperature compatible with the heating and injection means.

The burning of a big droplet is a slow process; but the burning of a very hot solitary droplet surrounded by an excess of air is a self sustaining process, and a complete combustion is assured.

Furthermore, in starting the surface combustion, the heat release of said combustion literally explodes the droplet, reducing ignition delay. Also, in a Wankel engine the rotor does not come to rest at t.d.c. and in this position the air is transferred from the trailing half of the rotor flank to the leading half. This transfer of high temperature gases creates a tremendous swirl that helps mixing, atomizing and burning of the heavy droplets. This ability of starting an engine independently of the compressed air temperature has a great advantage. In a regular Diesel engine a compression ratio of 20:1 is established to assure cold starting capability, but once the engine reaches the service temperature, a ratio of 12:1 might suffice; at full load in air-fuel (A/F) ratio of 25:1 is common, but with the engine idling the A/F ratio may go down to 60:1 and still carrying the penalty of a 20:1 compression on a full load of unused air. The thermal efficiency of a Diesel at moderate load may be over 40%, but it comes down to 10% at low load, and it is lower than 3% at idling speed, since all the energy is spend in friction and air pumping losses.

The heating of a fuel to a temperature above its ignition point presents problems in the amount of needed energy, in the control of flows and temperatures, and in the need of insulating and controlling a very hot and flammable liquid. Additional problems of polimerization and cracking of the fuel must also be considered.

In the present invention the engine must be able to start, and run in all conditions, with a compression so low that not enough heat is generated in the compressed air to ignite the injected fuel droplets.

Since the low compression engine will start with heated fuel, means has to be provided to that effect, independently of the prime mover. These means have to be basically reliable, have a very short delay, be thermodinamically efficient and economically atractive.

When all this facts are related and analysed, two large and diversified sources of heat are dropped: combustion heaters and electric heaters. Both of them have a very low yield of heat per surface unit of heating area (B.T.U./sq. in.). They would make any heater very bulky, slow to start up, fire risky and inefficient.

Instead, a hydraulic approach was choosen: the fuel is heated by pumping it throughout hydraulic restrictors. A hydraulic restrictor would be a static device that produces a fluid pressure drop simultaneously with a system temperature gain. This means: the restrictor is converting the mechanical energy used in pumping the fluid, into thermic energy that rise the fuel temperature. The general nature of the energy losses in a pumping system are:

a. friction losses like in a straight uniform lenght of pipe.

b. eddy losses, that occur in any part of the system where the flow is roughly disturbed like bends, tees, elbows, branches, etc.

After some calculations and experiments it was found that the best hydraulic restrictor would be a ceramic pipe having a small hole where high pressurized fuel will be pumped throughout, where it will generate by friction with the walls and/or eddy losses enough heat to reach its fuel ignition temperature.

This type of a heater has quite a few advantages. Since it is build in ceramic, it is very abrasive proof; and since ceramics are thermo-insulating materials, the thermal losses are negligible. This thermo insulated hydraulic restrictor is per se 100% efficient since any head pressure drop is converted only in heat. Also, the volume of fuel present into the heaters (hydraulic restrictor) at any time is minimal, very important for a fast cold engine start. An additional advantage of using a minimal quantity of fuel that remains a very short time in the heating area is avoiding fuel cracking and polimerization. And if, nevertheless, any polimerized subproduct sticks to the ceramic walls, the high speed flow is going to "peel it off."

Figure 3:
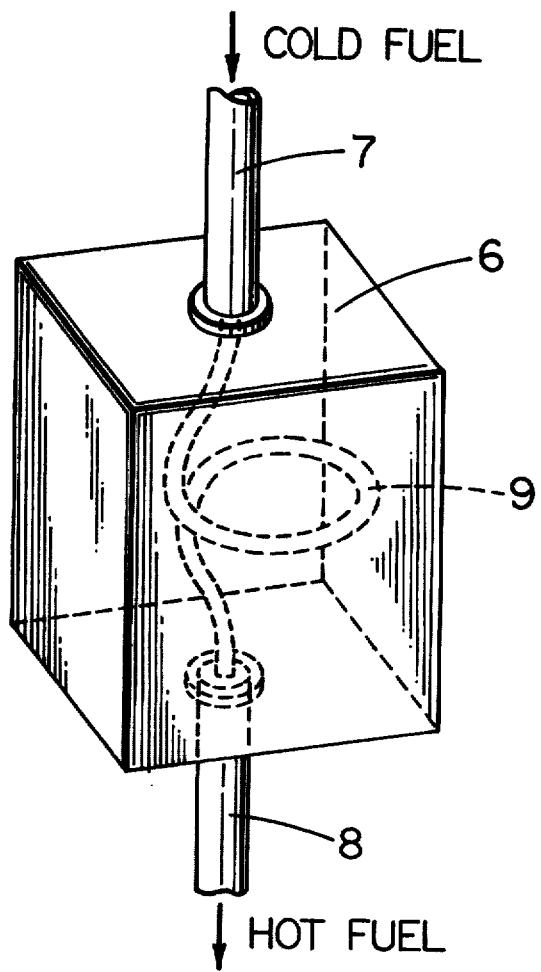
FIG. 3 depicts a perspective see-through view of a thermo insulated hydraulic restrictor.

As shown in FIG. 3 the thermo insulated hydraulic restrictor is a ceramic block having a cold fuel inlet consisting in a pipe coupling 7, brazed to or cast into the block; and a hot fuel outlet consisting also in a pipe coupling 8, brazed to or cast into the block 6. Cast, or machined, into the ceramic block are many fuel paths, hydraulically connecting the inlet with the outlet. For drawing clearness only one fuel path, 9, is shown, describing a spiral in dotted lines.

The amount of energy necessary for a 1°C increase in the temperature of 1 gram of fuel having a specific heat of 0.5 is 0.2136 kilogram-meter. For a fuel having an ignition temperature of 280°C, raising the injected fuel temperature from 20°C to say 300°C means spending 59.81 kilogram-meter per gram, that for an engine with a fuel consumption of 160 gr/HP/hour means a loss of about 3.5% of the engine output.

In order to achieve a temperature increase of 280°C (in above fuel) a theoretical hydraulic pressure drop of 65,000 lb/sq. in. must be achieved. Since the injected fuel temperature requirement varies with numerous factors, means are provided to produce a hydraulic pressure drop (into the hydraulic restrictor) proportional to the desired fuel temperature increase. To that effect the hydraulic restrictor is fed by a variable pressure pump.

FIG. 1 is a schematic diagram of the controls and equipment needed to run a rotary internal combustion engine by this invention guidelines. Here, 2 is a Wankel engine, 1 is the air intake valve, 5 is the fuel injector, 3 is a fuel injector pump of the variable pressure type; 4 is the fuel heating unit comprising a thermal insulated hydraulic restrictor(s) and a variable pressure pump.

In FIG. 1 all of the engine parameters: rpm, torque, injected fuel temperature, throttle position and compressed air temperature (deducted from the exhaust gases and engine temperature inputs), are fed into the logic circuit and the output signals -through servos 1, 2 and 3- controls the air intake, the injected fuel droplet size, and the injected fuel droplet temperature respectively.

The control of the three variables: droplet size, droplet temperature and air intake becomes complex because of the relation of them all, and it is the inventor's belief that some electronic or fluidic control must be used to avoid a mechanical nightmare of cams, connecting elements and mechanical amplifiers. For example, when the engine gets suddenly unloaded, the inducted intake air could be throttled, but then, the temperature of the injected droplet must be raised because the compressed air becomes cooler. If the throttling is severe and the rpm is still high, it may be necessary, even in a hot engine condition, to increase the size of the droplets to avoid a high rpm flame out. It may happen that even an increase in the droplet size and temperature would not avoid an engine flame out, because of the high rpm. In this case, the control system should disregard the efficiency taboo and increase the air intake to attain higher compression air temperature, or if possible, lower the rpm. All this should be done automatically with stepless adjustment, and instantaneously, by sensors that will detect the variance and provide input signals to the logic circuit, that will then process the information, to provide a predictable series of output signals to the engine being controlled.

Figure 2:
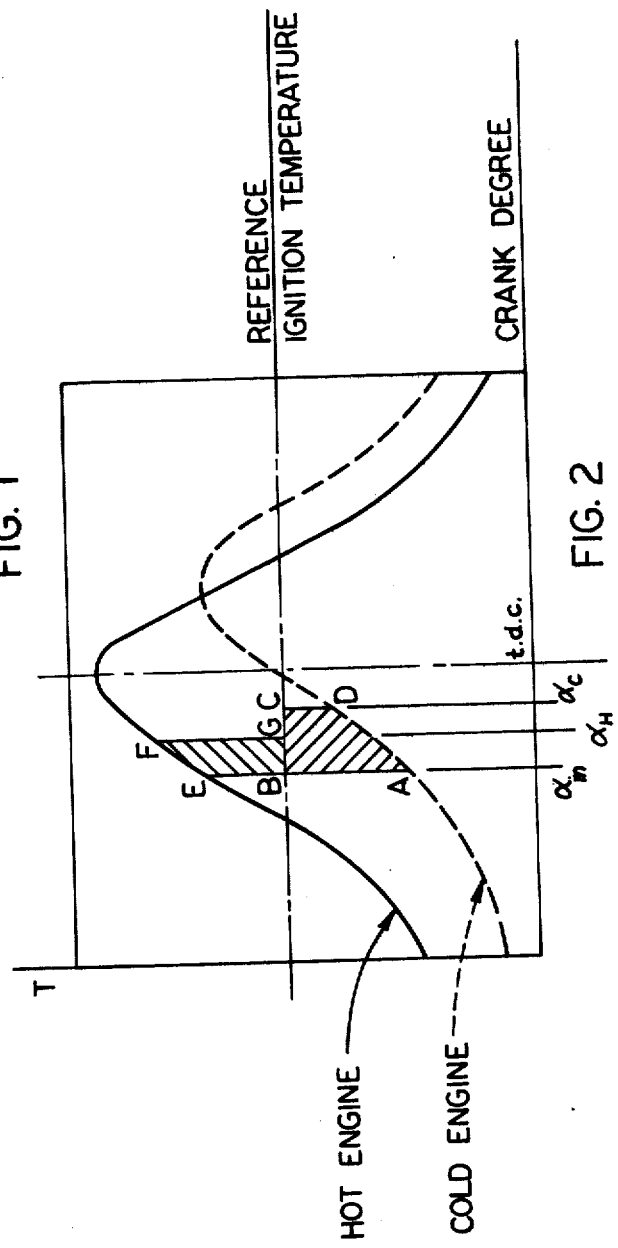
FIG. 2 is a time-temperature diagram illustrating compressed air temperature at various points in the operating cycle and relating them to the fuel ignition temperature.

Turning now to FIG. 2, where two different compressed air temperature curves are shown; they belong to the same theoretical Wankel engine having a 9:1 compression ratio. The solid curve refers to a 500 rpm warmed up engine where the temperature at start of compression (intake air) is 60°C, and the dotted line belongs to a cold starting at 100 rpm and 0°C intake air.

The horizontal line is the ignition reference temperature of a certain fuel. $\alpha_{in}$ is the fixed injection crank angle; $\alpha_H$ and $\alpha_C$ are the ignition crank angle for the hot and the cold engine conditions respectively. The temperature/time area (surface ABCD) below the line drawn at the reference ignition temperature represents the minimum energy that the injected fuel must transfer to the surrounding compressed air to start combustion while the engine is cold. In the warmed up engine condition the temperature/time area above the line drawn at the reference ignition temperature, (surface BEFG) represents the surplus energy in the compressed air able to ignite the fuel particles at an $\alpha_H$ crank angle. In this case -hot engine condition- there is no need of heating the injected fuel since the engine could work a typical compression ignition cycle; however, a 9:1 ratio will not produce a large heat surplus to assure a quick combustion. In this case any fuel heating would help shortening ignition delay.

Any air throttling, by reducing the air density will reduce the compression temperature and the corresponding temperature/time curve would fall below the fuel ignition reference line, thus resembling the cold start condition curve. Of course, an infinite array of family curves and parallel lines could be drawn, giving this engine a multifuel capability.

The ignition delay for a hot engine condition is measured by $\alpha_H - \alpha_{in}$ and the ignition delay for the cold engine condition is measured by $\alpha_C - \alpha_{in}$; the ignition delay is shorter for the hot engine condition because of the mass of heat available in the compressed air. In the cold engine condition the temperature starts rising with the droplets combustion, and since the combustion is intrinsically slower in this invention, the curve peak would be displaced past t.d.c., though this could be corrected by advancing the injection.

I claim:

1. In the continuous operation of a rotary internal combustion engine having an epithrochoidal shaped housing containing a rotor eccentrically rotatable to form with the housing successive combustion chambers of variable volume during which fuel and air are supplied to the combustion chambers, the method of operating the engine comprising supplying air to the chambers during a part of their formation with the fuel supplied to the chambers being above its ignition temperature and compressing the air in the combustion chamber prior to supplying the heated fuel to the chamber, moving the fuel supplied to the chamber along a path to frictionally increase its temperature prior to its introduction into the combustion chamber.

2. The method of operating a rotary internal combustion engine as in claim 1, pressurizing the moving fluid to move the same along a restricted thermally insulated path in a ceramic block.

3. In an internal combustion engine wherein fuel from a supply is preheated before being injected into the internal combustion engine,
the combination of a fuel pump,
a thermoinsulated hydraulic restrictor comprising a block of ceramic having cold fuel inlet means and hot fuel outlet means,
said ceramic block having at least a fuel path,
said fuel path hydraulically connecting said fuel inlet means to said fuel outlet means,
said fuel being pumped along said fuel path by said fuel pump to frictionally increase its temperature prior to its introduction into a combustion chamber of said internal combustion engine.

* * * * *